United States Patent [19]

Rees

[11] Patent Number: 5,006,594

[45] Date of Patent: * Apr. 9, 1991

[54] FLUORINATED THERMOPLASTIC ELASTOMERS CONTAINING POLYMERIC ADDITIVES AND PROCESS FOR PREPARING SUCH ELASTOMERS

[75] Inventor: Richard W. Rees, Geneva, Switzerland

[73] Assignee: E. I. Du Pont de Nemours and Company, Wilmington, Del.

[*] Notice: The portion of the term of this patent subsequent to Nov. 7, 2006 has been disclaimed.

[21] Appl. No.: 446,774

[22] Filed: Dec. 6, 1989

Related U.S. Application Data

[63] Continuation-in-part of Ser. No. 292,572, Dec. 30, 1988, abandoned.

[51] Int. Cl.$^5$ .................... C08L 27/12; C08L 27/16; C08L 27/18
[52] U.S. Cl. .................... 524/520; 525/189; 525/193; 525/194; 525/195; 525/196; 525/197; 525/199; 525/200
[58] Field of Search .............. 525/193, 194, 195, 196, 525/197, 199, 200, 189; 524/520

[56] References Cited

U.S. PATENT DOCUMENTS

| | | | |
|---|---|---|---|
| 4,026,863 | 5/1977 | Iseki et al. | 428/375 |
| 4,115,481 | 9/1978 | Finlay | 525/199 |
| 4,362,069 | 12/1982 | Giatras et al. | 428/389 |
| 4,879,362 | 11/1989 | Morgan | 525/902 |

FOREIGN PATENT DOCUMENTS 168020 1/1986 European Pat. Off. .

*Primary Examiner*—John C. Bleutge
*Assistant Examiner*—David Buttner
*Attorney, Agent, or Firm*—Donald W. Huntley

[57] ABSTRACT

New blends of fluorinated thermoplastic elastomers are disclosed that contain a two-phase composition including a continuous phase of a melt processible crystalline thermoplastic fluorocarbon resin and a dispersed phase of an amorphous crosslinked fluoroelastomer, and a dispersion-process-produced, non-fibrillating, non-melt-processible polytetrafluoroethylene (PTFE) powder. The PTFE copolymer is made up of recurring units of hexafluoropropylene, perfluoro(alkyl vinyl ether) wherein the alkyl group has 1–4 carbon atoms, and mixtures thereof. The PTFE compounds uniformly with the two-phase composition without forming visible agglomerates. Poly(phenylene sulfide) powder can be added to the blend to increase melt flow characteristics. Additionally, an uncured fluoroelastomer can be incorporated into the blend to enhance its mechanical properties. The preparation of the fluorinated thermoplastic elastomers involves dynamic curing of the fluoroelastomer in the presence of the molten thermoplastic fluorocarbon resin and the non-melt-processible PTFE resin.

17 Claims, No Drawings

FLUORINATED THERMOPLASTIC ELASTOMERS CONTAINING POLYMERIC ADDITIVES AND PROCESS FOR PREPARING SUCH ELASTOMERS

This application is a continuation-in-part of U.S. Ser. No. 292,572 filed Dec. 30, 1988, now abandoned.

FIELD OF THE INVENTION

This invention relates to fluorinated thermoplastic elastomers, and more particularly to fluorinated thermoplastic elastomers containing polymeric additives to improve physical properties.

BACKGROUND OF THE INVENTION

Two-phase compositions of a continuous phase thermoplastic polymer and a dispersed phase elastomer produced by dynamically curing the elastomer while it is dispersed in the thermoplastic are known. See for example, Coran et al. U.S. Pat. Nos. 4,348,502, 4,130,535, 4,173,556, 4,207,404 and 4,409,365.

Fluorinated and partially fluorinated crystalline thermoplastics are high volume commercial products. Such plastics often contain large amounts of the polymerized monomer, tetrafluoroethylene.

Fluorinated and partially fluorinated amorphous elastomers are also known high volume commercial products. Such elastomers include the cured (vulcanized or crosslinked) copolymers of vinylidene fluoride with hexafluoropropylene and the like. European Patent Application No. 168,020 discloses a two-phase fluorocarbon composition in which the continuous phase is a crystalline thermoplastic fluoropolymer, and the discontinuous phase is a crosslinked fluoroelastomer in which the dispersed phase constitutes 50-90% of the total composition. The composition is prepared by dynamic curing of the fluoroelastomer phase.

The use of polytetrafluoroethylene as an additive to enhance properties of elastomers or plastics has been a long sought goal because such blends have improved properties such as tear strength, flame resistance and abrasion resistance over those of the base resin. However, because fibrils and agglomerates of polytetrafluoroethylene (PTFE) ordinarily develop when PTFE is subjected to shear forces during compounding with other resins, the resulting blends are nonuniform and may show excessive modulus and have warping problems. Furthermore, due to the fibrillation and agglomeration, blends which contain known polytetrafluoroethylene resins are difficult to prepare and process especially at high additive levels.

The incorporation of fluoropolymers such as polytetrafluoroethylene and such polymers modified with comonomer into elastomers or thermoplastics has been attempted before. High molecular weight, non-melt-processible polymers of tetrafluoroethylene, (hereinafter abbreviated TFE) including those which contain small amounts of comonomers such as hexafluoropropylene, tend to draw out into fibers, or fibrillate, when sheared. Although it is a useful property for some applications such as paste extrusion onto wire, this fibrillation causes problems when the polytetrafluoroethylene or modified polytetrafluoroethylene is to be incorporated into an elastomer or a thermoplastic. The fibrillating tetrafluoroethylene polymer forms visible agglomerates and results in undesirable increases in modulus when incorporated into elastomers. When compounded into thermoplastics, the fibrillating tetrafluoroethylene polymer causes undesirable melt swell when the polymer melt is forced through an orifice such as the die at the end of an extruder. The addition of melt-processible fluorocarbon resins such as copolymers of tetrafluoroethylene with hexafluoropropylene or perfluoro(propyl vinyl ether) or low molecular weight, irradiated PTFE, to elastomers or thermoplastics avoids the problems of fibrillation but this approach does not improve certain properties of the elastomer or thermoplastic.

It is an object of the present invention to provide a fluorinated thermoplastic elastomer that contains a tetrafluoroethylene copolymer which does not fibrillate or agglomerate when subjected to shear, and which improves extrudate quality. It is a further object of the invention to provide a composition with thermoplastic and elastomeric properties and that may further contain poly(phenylene sulfide) and an uncured perfluoroelastomer to increase the melt flow rate of the composition while improving the tensile strength and elongation properties of the composition. An advantage of the thermoplastic compositions of the invention is that flash, or defective parts can be reprocessed without difficulty. These and other objects, features, and advantages will become apparent upon the following description of the invention.

SUMMARY OF THE INVENTION

Accordingly, the blends of this composition comprise a two-phase composition having a continuous phase and a dispersed phase, together with a tetrafluoroethylene copolymer. The continuous phase consists essentially of a melt-processible crystalline thermoplastic fluorocarbon resin containing a minimum of 38 percent by weight fluorine. The dispersed phase consists essentially of an amorphous crosslinked fluoroelastomer containing at least about 50 percent by weight fluorine. The dispersed phase constitutes between about 50 and 90 percent by weight of the two phase composition. The blends contain 1-5 weight percent of a nonfibrillating, dispersed-process-produced, non-melt-processible tetrafluoroethylene copolymer comprising recurring units of tetrafluoroethylene and a comonomer selected from the class consisting of hexafluoropropylene, perfluoro(alkyl vinyl ether) where the alkyl group has 1-4 carbons, and a mixture of them. Enough comonomer is present to cause the copolymer to compound uniformly with the fluorocarbon resin and the fluoroelastomer without forming visible agglomerates.

In an alternative embodiment of the invention, the blend additionally contains 1-5 weight percent of poly(phenylene sulfide) powder. In still another alternative embodiment of the invention, the blend may contain 1–5 weight percent of an uncured perfluoroelastomer comprising at least 95 percent by weight of a copolymer of tetrafluoroethylene and perfluoro(methyl vinyl ether).

DETAILED DESCRIPTION OF THE INVENTION

The thermoplastic crystalline fluorocarbon resins useful in compositions of the present invention must be "melt-processible". By "melt-processible" we mean a polymer whose melt flow can be measured in an extrusion plastometer [ASTM D-1238, D-2116] at a temperature above the crystalline melting point of the polymer. Polytetrafluoroethylene cannot be processed by the usual methods of thermoplastic fabrication because of its viscoelastic properties, as described in ASTM D-1457. Polytetrafluoroethylene is not melt-processible. Generally, the thermoplastic crystalline fluorocarbon resin will contain a minimum of 38 percent by weight fluorine. Further the thermoplastic crystalline fluorocarbon resin should be melt-processible at a temperature below that at which degradation of the amorphous fluorocarbon elastomer occurs to any significant degree. The thermoplastic crystalline fluorocarbon resins useful in the compositions of this invention include (a) copolymers of tetrafluoroethylene and ethylene, copolymers of tetrafluoroethylene and hexafluoropropylene, copolymers of tetrafluoroethylene and perfluoro(propyl vinyl ether) and copolymers of tetrafluoroethylene and perfluorobutyl ethylene, (b) homopolymers of vinylidene fluoride as well as copolymers of vinylidene fluoride in which the vinylidene fluoride is the greatly predominant polymerized monomer, and (c) copolymers of chlorotrifluoroethylene with ethylene or halogenated monomers. Such polymers are well known in the art and many are commercially available.

The elastomeric components useful in the blends of this invention are well known in the art and are usually commercially available. Suitable elastomeric components include copolymers of vinylidene fluoride and one or more fluoromonomers containing 2 to 8 carbon atoms; copolymers of vinylidene fluoride and hexafluoropropylene; terpolymers of tetrafluoropropylene, vinylidene fluoride and hexafluoropropylene; terpolymers of hexafluoropropylene, vinylidene fluoride and bromotetrafluorobutene-1; copolymers of tetrafluoroethylene, vinylidene fluoride, hexafluoropropylene, and bromotetrafluorobutene-1; terpolymers of hexafluoropropylene, vinylidene fluoride and iodotetrafluorobutene-1; polymers of propylene and tetrafluoroethylene optionally also containing vinylidene fluoride; and mixtures of all these components. Such elastomers usually have molecular weights (prior to curing) such that they have a Mooney viscosity of about 30 to 200 [ML-10 at 100° C.]. The elastomeric component of the composition of the present invention generally will contain a minimum of about 50 percent by weight fluorine.

The elastomer phase of the composition of the invention may be cured with conventional curing systems known for curing fluoroelastomers, such as bisphenol-/organophosphonium salts, bisphenol/organoammonium salts, and peroxides. Examples of such systems include combinations of (a) magnesium oxide, Bisphenol AF and organophosphonium salts; (b) magnesium oxide, the dipotassium salt of Bisphenol AF and dicyclohexyl 18 Crown 6; (c) 2,5,dimethyl-2,5- ditertbutylperoxyhexyne-3 (sold as Luperco 130 XL—45% active ingredient on a solid support) with meta phenylenebismaleimide or triallyl isocyanurate (1,3,5-triallyl-1,3,5-triazine-2,4,6-(1H,3H,5H)-trione); and (d) cumene hydroperoxide and m-phenylene bis-maleimide.

The compositions of the invention contain about 50 to 90 percent by weight of the cured elastomeric component, preferably about 60 to 80 percent by weight, the remaining portion of the composition being the thermoplastic crystalline fluorocarbon resin.

Poly(phenylene sulfide) (PPS) serves to increase the melt flow rate of the blend of the present invention when introduced in quantities of 1-5 weight percent. Ryton PPS powder, supplied by Phillips Petroleum, is one variety of PPS that is acceptable for the blend. When the PPS was incorporated into the blends of the subject invention, it unexpectedly enhanced the melt flow rate beyond that which was anticipated.

The inclusion of an additional fourth component, namely, an uncured perfluoroelastomer such as copolymers of tetrafluoroethylene and perfluoro(alkyl vinyl ether) into the blend of the present invention improves the mechanical properties of the blend. Examples of uncured fluoroelastomers useful in the present invention are copolymers of tetrafluoroethylene, perfluoro(methyl vinyl ether), and optionally, small quantities, 0.1 to 5.0 weight %, of either perfluorophenoxy vinyl ether or vinylidene fluoride. The incorporation of the additional uncured fluoroelastomer into the blend of the present invention unexpectedly and surprisingly improved the tensile strength and elongation of the blend.

The particle size of the dispersed phase of the compositions of the invention covers a wide range, and depends among other things on the processing conditions under which the compositions were prepared, the amount of each component in the compositions, and the viscosity of each component in the composition. In general more desirable physical properties are obtained with the composition of the invention having greater than 50 percent of the weight of the elastomeric particles smaller than about 3 micrometers. The amorphous crosslinked fluoroelastomer may be fully fluorinated or partially fluorinated.

The two-phase compositions of the invention may be prepared by the process of the invention. This process comprises melt blending the fluorocarbon resin, fluoroelastomer, and tetrafluoroethylene copolymer, such that tetrafluoroethylene copolymer compounds uniformly with the fluorocarbon resin and fluoroelastomer without forming visible agglomerates. The fluoroelastomer is crosslinked in the presence of one or more curing agents, metal oxides, and hydroxides, at a temperature above the melting point of the fluorocarbon resin while continuously subjecting to high shear mixing. Alternatively, the tetrafluoroethylene copolymer may be added to the thermoplastic fluorocarbon resin prior to the introduction of the fluoroelastomer. Additional polymeric additives, such as poly(phenylene sulfide) and the uncured perfluoroelastomer discussed previously, may be added together with the tetrafluoroethylene copolymer. The curing agents, metal oxides, and hydroxides may be added to the fluoroelastomer prior to the addition to the molten fluorocarbon resin.

The temperature of the mixture after the addition of the curing agent may be increased to speed up the reaction. The mixture may be removed from the mixing device prior to completion of the curing reaction if desired, provided the temperature is maintained at a level sufficiently high to complete the curing reactions. The composition may also be prepared by mixing in an extruder.

The dispersion-process-produced, non-melt-processible, non-fibrillating tetrafluoroethylene copolymers useful in blends of the present invention contain monomers that are polymerized in aqueous dispersion containing a dispersing agent present in amounts sufficient to cause the polymer particles to remain in dispersed form during polymerization. The polymer dispersion is coagulated under low shear to obtain the particles, and the particles are then separated and dried. These particles are called "dispersion-process-produced" particles.

The polymerization of particles is carried out in a gently agitated aqueous medium with the monomers added under pressure. The medium will contain a nontelogenic dispersing agent such as ammonium perfluorooctanoate or caprylate. The amount of dispersing agent can range from 0.05 to 0.5% by weight of water used, and it can be added in increments if desired. Any suitable initiator can be used. A preferred system is a mixture of ammonium persulfate and disuccinic acid peroxide. The initiator amount can vary widely; but generally will be between 0.0005 to 0.3% by weight of water. The initiator will be added at the beginning of the reaction, and may also be added subsequently. Chain transfer agents may also be used and added in the same manner.

A sufficient amount of comonomer must be in the outer portions of the dispersed particle. This assures that the copolymer will compound uniformly with an elastomer without agglomeration. If the comonomer is highly reactive in polymerization, it must be added toward the end of the polymerization to ensure its presence in the outer portions of the dispersed particle (which are formed last). If the comonomer is not highly reactive, it can be added at the beginning or near the end; or the comonomer/TFE ratio may be increased toward the end of the reaction. The comonomers are present in amounts greater than usually employed in commercial comonomer-modified PTFE, but not present in amounts great enough to cause the PTFE to lose its non-melt-fabricable character.

When the polymerization is complete, the polymer in the polymerization medium is coagulated by conventional procedures such as described in U.S. Pat. No. 3,142,665, then dried. Coagulation will occur by use of mild agitation and/or by chemical coagulation. Alternatively, the dispersion may be treated chemically with first a gelling agent and then a water-immiscible liquid to agglomerate the resin, with or without some other filler, as described in various references such as in U. S. Pat. Nos. 4,451,616 and 4,368,296.

As to comonomers, for hexafluoropropylene (HFP), the amount present is at least 0.08 weight percent and can be as high as 0.9 weight percent although the upper limit is not critical. HFP content is determined by the method described at column 5, lines 1-12 of Cardinal, U.S. Pat. No. 3,142,665.

For the perfluoro(alkyl vinyl ethers) of 1-4 alkyl carbon atoms, the amount present should be greater than 0.02 weight percent, and can be as high as 0.3 weight percent. The perfluoro(alkyl vinyl ether) content was determined by Fourier Transform (FT) IR spectroscopy. The C—O—C band occurs at 995 cm$^{-1}$ for perfluoropropylvinyl ether and at 985 cm$^{-1}$ for perfluoromethyl vinyl ether (PMVE). A 0.3 g sample of the polymer was leveled between pieces of aluminum foil in a cylindrical mold, 2.86 cm in inside diameter. A pressure of 1409 kg/cm$^2$ was applied for one minute at ambient temperature. The pressed sample, which was 0.025 cm thick, was then analyzed by IR. The sample was scanned from 1040 to 877 cm$^{-1}$. A straight base line was drawn from the absorbance minimum at 1010 cm$^{-1}$ to that at 889 cm$^{-1}$. The ratio of the absorbance from the base line to the maximum at 985 cm$^{-1}$ or 995 cm$^{-1}$, as the case may be, to the absorbance from the base line to the maximum at 935 cm$^{-1}$ was obtained. The actual weight percent perfluoro(propyl vinyl ether) (PPVE) was obtained by multiplying the ratio by 0.14 (determined from a calibration curve). No calibration curve was established for PMVE but a greater proportion of that added is probably incorporated into the polymer since it is more reactive than PPVE.

The polymers are non-melt-fabricable. By this is meant that no melt flow is detected when tested by the standard melt viscosity determining procedure for melt-processible polymers. This test is according to American Society for Testing and Materials test D-1238-52T, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 380° C. Five minutes after the sample is charged to the cylinder, it is extruded through a 2.10 mm (0.0825 inch) diameter, 8.00 mm (0.315 inch) long square-edge orifice under a load (piston plus weight) of 5000 grams. This corresponds to a shear stress of 44.8 Kpa (6.5 pounds per square inch). If any melt extrudate was observed, it was so noted.

In some instances, perfluorobutyl ethylene comonomer is also added in addition to the comonomers previously mentioned. It helps reduce formation of coagulum in the polymerization vessel during polymerization.

The tetrafluoroethylene copolymers used in the invention have about the same yield strength as commercial non-melt-processible resins but lower break strengths (thus higher ratios of yield to break strengths). This indicates that the resin apparent modulus (stiffness) due to drawing is less for the resins of the invention. Another indication of this effect is the reduced rheometer pressures measured for the new resins. Both of these observations indicate less fibril or other molecular orientation upon stressing the polymer. This may explain, in part, why uniform blends of the resins of the invention in elastomers and other polymers are easier to prepare and have lower moduli than those obtained with known non-melt-processible resins. Nonuniform blends of resins tend to result in warped molded objects. Reduced fibrillation promotes more uniform blends but toughening the blend to decrease elongation is also required for the fluoropolymer to reinforce other elastomers. The elongation of a modified PTFE resin is a function of its molecular weight and of the resin comonomer content and type. A reduced PTFE homopolymer molecular weight will reduce the tendency to form fibrils during shear but if the molecular weight is reduced enough to essentially stop fibril formation, the elongation of the resulting resin is too low for it to reinforce another elastomer. It has been found that the presence of some minimum level of comonomer other than TFE will drastically reduce the tendency to fibrillate without a significant drop in molecular weight and thus elongation.

The term "elastomer" as used herein has its normal meaning, that is, the material, when cured and after being stretched to twice its normal length and released will return with force to substantially its original length.

Compositions of this invention have improved extrusion characteristics.

The blend of the invention may contain fillers, antioxidants, stabilizers, pigments, processing aids, metal oxides, and the like in amounts conventionally added to fluorocarbon polymers of the art. Metal cation sources include zinc oxide and magnesium oxide. The blend may include calcium hydroxide, and may be pigmented with titanium oxide.

EXAMPLES

The compositions of the examples set forth below incorporated a variety of ingredients shown in Table 1.

TABLE 1

| Description of Materials | |
|---|---|
| Fluororesin: | A commercially available copolymer containing 77.6% tetrafluoroethylene, 19% ethylene and 3.4% of perfluorobutylethylene, having a melting point of 255-280° C. and a melt index of 8 g/10 min at 297° C. (ASTM D-3159) |
| Fluoroelastomer: | A commercially available composition consisting of 97.45 parts of a copolymer of 60% vinylidene fluoride and 40% hexafluoropropylene having a Mooney viscosity of 60 at 100° C., 0.55 parts of benzyltriphenylphosphonium chloride and 2.0 parts of 4,4'-hexafluoroisopropylidene diphenol (bisphenol AF) |
| Aflas ® 100H: | A commercially available (from Asahi Glass Co., Japan) alternating copolymer of propylene and tetrafluoroethylene |
| Non-fibrillating PTFE: | A dispersion-produced, non-fibrillating and non-melt-processible polymer prepared as described in the detailed description. |
| PPS: | Ryton ® PPS, a commercially available grade of poly(phenylene sulfide) from Phillips Petroleum Co. |
| Perfluoroelastomer #1: | A commercially available copolymer of tetrafluoroethylene, perfluoro(methyl vinyl ether) and perfluoro(phenoxy vinyl ether) from E. I. du Pont de Nemours & Co., Inc. |
| Perfluoroelastomer #2: | A commercially available copolymer of tetrafluoroethylene, perfluoro(methyl vinyl ether) and vinylidene fluoride from E. I. du Pont de Nemours & Co., Inc. |

Metal oxides and metal hydroxides used in examples include zinc oxide, magnesium oxide, and calcium hydroxide. "MT Black" was occasionally introduced into compositions of examples as a filler. In addition, the pigment "R-101" titanium oxide was added to the compositions of some examples.

The compositions of all Examples, except Comparative Examples 1 and 3, and Example 11 were prepared in the following manner: The fluoroelastomer was precompounded with metal oxides and the Aflas ® 100H and filler on a cold mill. The fluororesin was then melted at low rpm in the mixer, a Haake Rheomix 6C intensive mixer. The compounded fluoroelastomer was added to the fluororesin at 300° C. (which exceeded the melting points of these ingredients) and 100 rpm. The processing aids were introduced into the mixer immediately thereafter. Alternatively, the processing aids can be added to the fluoroplastic before introducing the compounded elastomer to the mixer. Mixing was continued for 10 minutes.

The compositions of Comparative Examples 1 and 3 and Example 11 were prepared by adding all ingredients separately, with the last ingredient added being the metal oxides. This procedure gave samples with lower melt flow ratings than by the above procedure.

The elastomeric product was removed while hot and after cooling was chopped into approximately ⅛ inch granules. In all cases, melt flow was measured in a standard melt indexer (ASTM D-1238) at 325° C. with a 10 kg load on the piston. Extrudate quality was rated from 1 (smooth and glossy) to 10 (deeply fractured and discontinuous). Tensile strength and elongation at break were measured at 2 inches per minute at 20° C. (ASTM D-638-77) on specimens die-cut from 50 mil thick compression-molded slabs. All the compositions were moldable and remoldable at 280°-300° C.

The non-fibrillating and non-melt-processible PTFE polymer was prepared as follows: A horizontally disposed, water-steam jacketed, cylindrical stainless steel autoclave, having a paddlewheel agitator running the length of the autoclave, and having a length-to-diameter ratio of about 1.5 to 1 and a water capacity of 39,000 parts was charged with 20,400 parts of demineralized water, five parts of ammonium perfluorocaprylate dispersing agent and 600 parts of paraffin wax. The autoclave contents were heated to 80° C. and the autoclave was then evacuated and purged with TFE monomer. A reduced pressure was then left on the autoclave and it was heated up to 88° C. after which it was pressured up to 380 psig (2.6 MPa) with tetrafluoroethylene monomer. The agitator was turned on at 43 rpm and 500 parts were added to the autoclave of a solution of 1.2 parts ammonium persulfate, 15 parts disuccinic acid peroxide, and 3 parts methanol made up to 1500 parts with demineralized water. After kickoff occurred (10 psig or 0.07 MPa drop in pressure), the temperature of the reaction mixture was controlled at 90° C. for the duration of the polymerization. The agitator speed was maintained at 42 rpm and the autoclave pressure was maintained at 380 psig (2.6 MPa) by the addition of tetrafluoroethylene monomer. When 1360 parts of tetrafluoroethylene had been added after kickoff, 1000 parts of a solution of 25 parts of ammonium perfluorocaprylate in demineralized water was pumped into the autoclave at 50 parts/minute. When 5900 parts of tetrafluoroethylene monomer had been added after kickoff, the monomer feed was stopped and the pressure was allowed to react down to 185 psig (1.3 MPa). The autoclave was then vented to 15-20 psig (0.11-0.14 MPa) with tetrafluoroethylene. Another 300 parts of the initiator/methanol solution described above were pumped into the autoclave simultaneously with tetrafluoroethylene repressurization. The agitator was turned on and the speed raised slowly to 40 rpm where it was held for the remainder of the polymerization. After kickoff again occurred, tetrafluoroethylene monomer was added to maintain the 380 psig (2.6 MPa) pressure. After 3630 parts of tetrafluoroethylene had been added after the second kickoff, the agitator was turned off and the autoclave was vented to atmospheric pressure. The dispersion was then dropped from the autoclave at atmospheric pressure and cooled. The dispersion was coagulated by stirring to give a powder which was then isolated and dried at 150° C. for four days. The polymer contained 0.16 weight percent hexafluoropropylene and had an SSG of 2.271. The ratio of polymer weight polymerized during the two stages of reaction was 65/35 including the reaction of a portion of the tetrafluoroethylene used to pressurize the autoclave. The calculated hexafluoropropylene content of the polymer made during the second reaction stage was 0.45 weight percent.

The polymer exhibited no melt flow at 350° C., as determined by ASTM D-1238-52T. A sample was molded and sintered as described ASTM D-1457 for the measurement of tensile properties. Microtensile bars were cut and tested at a strain rate of two inches per minute (5.1 cm/min) giving a tensile yield/break ratio of 1.29 and an elongation at break of 447%.

Rheometer extrusion pressures were measured in accordance with ASTM D-1457-83, except that the resin was not sieved before mixing with the "Varsol" lubricant and the preform was made in a 26 mm diameter extension tube at 2.1 MPa (300 psi). Measurements at "Varsol" levels of 18.0% and 19.2% gave 2600/1 rheometer pressures of 16.4 and 8.5 MPa, respectively.

The modified polytetrafluoroethylene polymers used in this invention are unusual in that unlike most dispersion-produced polytetrafluoroethylene polymers:
(1) They cannot be successfully paste extruded because their green strength is too low,
(2) They form platelets on shear blending into elastomeric compositions instead of fibrillating,
(3) Their ratio of yield strength to break strength generally is over 0.50, whereas for usual dispersion-produced polymers it generally is below 0.5,
(4) Their extrusion pressure is less than 3500 psi (24.1 MPa), whereas for usual dispersion-produced polymers it is over 3500 psi (24.1 MPa).

COMPARATIVE EXAMPLE 1

A composition containing 30 parts fluororesin, 70 parts fluoroelastomer, 4 parts zinc oxide, 2 parts magnesium oxide, and 5 parts MT black was prepared according to the above recited procedure. Subsequent analyses of the sample composition revealed a melt flow of 0.2 g/10 min, an extrudate quality rating of 9, a tensile strength of 1900 psi, and an elongation of 210 percent. Thus, it is apparent that the thermoplastic elastomer alone has a very poor extrudate quality. It is estimated that by the alternate mixing procedure, described above, this sample would have a melt flow or about 2.5 g/10 min.

EXAMPLE 1

The composition of Comparative Example 1 was prepared according to the above recited procedure, additionally containing 1 part of non-fibrillating PTFE. Analyses of the sample composition revealed a melt flow of 1.8 g/10 min, an extrudate quality rating of 4, a tensile strength of 1620 psi, and an elongation of 150 percent.

EXAMPLE 2

The composition of Comparative Example 1 was prepared according to the above recited procedure, additionally containing 2 parts of non-fibrillating PTFE. Analyses of the sample composition showed a melt flow of 0.9 g/10 min, an extrudate quality rating of 2, a tensile strength of 1710 psi, and an elongation of 160 percent. Thus, the compositions of Examples 1 and 2 illustrate that the incorporation of non-fibrillating polytetrafluoroethylene to the thermoplastic elastomer substantially improves the extrudate quality rating, as compared to Comparative Example 1 which does not contain the non-fibrillating PTFE.

EXAMPLE 3

A composition containing 30 parts fluororesin, 70 parts fluoroelastomer, 4.2 parts calcium hydroxide, 2.1 parts magnesium oxide, 5 parts MT Black, and 2 parts non-fibrillating PTFE was prepared according to the above described procedure. The composition exhibited a melt flow of 1.3 g/10 min, an extrudate quality rating of 4, a tensile strength of 1400 psi, and an elongation of 120 percent.

EXAMPLE 4

The composition according to Example 3 was prepared according to the procedure described above, but containing a total of 3 parts of non-fibrillating PTFE. This composition exhibited a melt flow of 0.7 g/10 min, an extrudate quality rating of 4, a tensile strength of 1430 psi, and an elongation of 110 percent.

EXAMPLE 5

The composition of Example 3 was prepared according to the relevant procedure outlined above, but containing a total of 4 parts non-fibrillating PTFE. Analyses of this composition revealed a melt flow of 0.3 g/10 min, an extrudate quality rating of 3, a tensile strength of 1260 psi, and an elongation of 75 percent.

EXAMPLE 6

The composition of Example 3 was prepared by the relevant procedure, but containing a total of 5 parts non-fibrillating PTFE. Analysis of the composition demonstrated a melt flow of 0.25 g/10 min, an extrudate quality rating of 2, a tensile strength of 1380 psi, and an elongation of 50 percent.

The Examples 3 through 6 illustrate that an improvement in extrudate quality rating for a thermoplastic elastomer contemplated in this invention including calcium hydroxide and MT Black is achieved wit the addition of non-fibrillating polytetrafluoroethylene. Further, the improvement in extrudate quality is directly proportional to the amount of non-fibrillating PTFE incorporated into the composition. Note that the non-fibrillating PTFE is detrimental to the tensile strength and elongation of the thermoplastic elastomer; the compositions of the alternative embodiments of this invention with other polymeric additives restore and/or increase these properties.

COMPARATIVE EXAMPLE 2

The composition according to Comparative Example 1 was prepared by the relevant procedure outlined herein. The composition further contained 1 part of PPS. This composition exhibited a melt flow of 4 g/10 min, an extrudate quality rating of 5, a tensile strength of 1210 psi, and an elongation of 100 percent.

This Comparative Example shows that melt flow is improved over compositions not containing Ryton ® PPS, such as the composition of Comparative Example 1.

EXAMPLE 7

The composition of Comparative Example 1 was prepared, according to the procedures specified above. In addition, the composition of this example contained 1 part PPS and 1 part non-fibrillating PTFE. Analysis the composition revealed a melt flow of 2.6 g/10 min, an extrudate quality rating of 3, a tensile strength of 1030 psi, and an elongation of 90 percent.

EXAMPLE 8

The composition of Comparative Example 1 was prepared according to the appropriate procedure, additionally containing 2 parts of PPS and 2 parts of non-fibrillating PTFE. The composition demonstrated a melt flow of 1.8 g/10 min, an extrudate quality rating of 2, a tensile strength of 1560 psi, and an elongation of 130 percent.

EXAMPLE 9

The composition of Comparative Example 1 was prepared according to the relevant procedure, containing a total of 1 part PPS and 3 parts non-fibrillating PTFE. Subsequent analysis of the composition revealed a melt flow of 1.4 g/10 min, an extrudate quality rating of 2, a tensile strength of 1710 psi, and an elongation of 155 percent.

The compositions of Examples 7, 8 and 9, when compared to the composition of Comparative Example 2, show that in a thermoplastic elastomer containing PPS, extrudate quality is improved with the addition of the non-fibrillating PTFE. Moreover, a comparison of the compositions of Examples 7, 8, and 9 (thermoplastic elastomers containing PPS and non-fibrillating PTFE) with the compositions of Examples 1 and 2 (thermoplastic elastomers containing non-fibrillating PTFE but not PPS) shows that the PPS contributes an increased melt flow to the composition. However, the tensile strength and elongation of the composition containing both PPS and non-fibrillating PTFE are still inferior to that of the thermoplastic elastomer alone, the composition of Comparative Example 1. The addition of another polymeric additive will improve these properties, as is disclosed below.

EXAMPLE 10

A composition was prepared according to the procedures set forth herein, containing as the base thermoplastic elastomer 30 parts fluororesin, 70 parts fluoroelastomer, 4 parts zinc oxide, 2 parts magnesium oxide, and 5 parts R-101 titanium oxide. The composition additionally contained 2 parts of PPS and 2 parts of non-fibrillating PTFE. Analysis of the composition revealed a melt flow of 1.3 g/10 min, an extrudate quality rating of 2, a tensile strength of 1800 psi, and an elongation of 185 percent.

COMPARATIVE EXAMPLE 3

The composition of Comparative Example 1 additionally containing 2 parts of perfluoroelastomer #2 was prepared according to the relevant procedure. The composition exhibited a melt flow of 0.06 g/10 min, an extrudate quality rating of 5, a tensile strength of 1840 psi, and an elongation of 200 percent.

EXAMPLE 11

The composition of Comparative Example 3 was prepared but also including 2 parts non-fibrillating PTFE. Analysis of the composition revealed a melt flow of 0.04 g/10 min, an extrudate quality rating of 2, a tensile strength of 2050 psi, and an elongation of 190 percent. With reference to Comparative Example 3, it can be seen that the inclusion of non-fibrillating PTFE into the composition improves the extrudate quality while the physical properties of the composition (tensile strength and elongation) are retained.

COMPARATIVE EXAMPLE 4

The base thermoplastic elastomer of Example 10 additionally containing 1 part perfluoroelastomer #1 was prepared according to the relevant procedure. The composition had a melt flow of 2.2 g/10 min, an extrudate quality rating of 8, a tensile strength of 1540 psi, and an elongation of 170 percent.

EXAMPLE 12

The base thermoplastic elastomer of Example 10 was prepared additionally containing 2 parts non-fibrillating PTFE and 1 part perfluoroelastomer #1. The composition upon analyses revealed a melt flow of 4.6 g/10 min, an extrudate quality rating of 2, a tensile strength of 2320 psi, and an elongation of 230 percent.

In comparison to Comparative Example 4, the composition of this Example demonstrated a vastly superior extrudate quality rating. This is due to the inclusion of the non-fibrillating PTFE to the composition. In addition, this example exhibits better physical properties (tensile strength and elongation) than the composition of Example 10 containing no perfluoroelastomer #1 at all.

COMPARATIVE EXAMPLE 5

The base thermoplastic elastomer of Example 10 was prepared according to the relevant procedure. It also contained 2 parts PPS and 1 part perfluoroelastomer #1. The composition revealed a melt flow of 3.2 g/10 min, an extrudate quality rating of 3, a tensile strength of 1770 psi and an elongation of 190 percent.

EXAMPLE 13

The base thermoplastic elastomer of Example 10, additionally containing 1 part PPS, 1 part non-fibrillating PTFE, and 1 part perfluoroelastomer #1, was prepared according to the appropriate procedure. This composition upon analysis revealed a melt flow of 2.6 g/10 min, an extrudate quality rating of 2, a tensile strength of 2150 psi, and an elongation of 220 percent.

This example illustrates the composition according to the invention incorporating several polymeric additives. The composition exhibited excellent melt flow, an extrudate surface that was smooth and unfractured, and superior tensile strength and elongation values. In comparison to Comparative Example 5, it is revealed that the addition of non-fibrillating PTFE to the base material improves extrudate quality.

EXAMPLE 14

Fluoroelastomer (60 g), Aflas ® 100H (20 g), zinc oxide (4 g), magnesium oxide (2 g), and MT black (5 g) were precompounded on a rubber mill at ambient temperatures. Fluororesin (20 g), PPS (2 g), and non-fibrillating PTFE (2 g) were mixed in the Haake Rheomix at 300° C. until the fluororesin was melted, and then the precompounded rubber mix was added as a continuous strip at 100 rpm. Mixing was continued for 10 min and the elastomeric material was removed while hot.

Material from ten such runs was combined and chopped into approximately 3 mm (⅛ in) granules that could be fed to a 19 mm (¾ in) diameter Haake Rheomix extruder equipped with a round beading die. Extrusion was carried out at screw speeds from 10 to 50 rpm with the melt at 300° C. A uniform, smooth extrudate with a dull surface was obtained at all screw speeds.

COMPARATIVE EXAMPLE 6

The procedure of Example 14 was followed, with the exception that PPS and the non-fibrillating PTFE were not included. During extrusion the extrudate was severely cracked, even at the minimum extrusion rate.

COMPARATIVE EXAMPLE 7

The procedure of Example 14 was followed, with the exception that the non-fibrillating PTFE was omitted. Good quality extrudates could only be obtained at screw speed of 10 rpm or less.

What is claimed is:

1. A blend comprising:
   (a) a two-phase composition having a continuous phase and a dispersed phase, the continuous phase consisting essentially of a melt-processible crystalline thermoplastic fluorocarbon resin containing a minimum of 38 percent by weight fluorine, said dispersed phase consisting essentially of an amorphous crosslinked fluoroelastomer containing a minimum of 50 percent by weight fluorine, said dispersed phase constituting between about 50 and 90 percent by weight of the two-phase composition; and
   (b) 1-5 weight percent of a dispersion-process-produced, non-fibrillating, non-melt-processible tetrafluoroethylene copolymer comprising recurring units of tetrafluoroethylene and a comonomer selected from the class consisting of hexafluoropropylene, perfluoro(alkyl vinyl ether) where the alkyl group has 1-4 carbons, and a mixture of them with enough comonomer present to cause the copolymer to compound uniformly with said fluorocarbon resin and said fluoroelastomer without forming visible agglomerates.

2. The blend of claim 1 additionally containing 1-5 weight percent of poly(phenylene sulfide) powder.

3. The blend of claim 1 additionally containing 1-5 weight percent of an uncured perfluoroelastomer.

4. The blend of claim 3 wherein the perfluoroelastomer is a copolymer of tetrafluoroethylene and perfluoro (methyl vinyl ether).

5. The blend of claim 2 additionally containing 1-5 weight percent of an uncured perfluoroelastomer.

6. The blend of claim 5 wherein the perfluoroelastomer is a copolymer of tetrafluoroethylene and perfluoro (methyl vinyl ether).

7. The blend of claim 1 wherein the amorphous crosslinked fluoroelastomer is a copolymer of vinylidene fluoride and one or more fluoromonomers containing 2 t 8 carbon atoms.

8. The blend of claim 7 wherein the amorphous crosslinked fluoroelastomer is a copolymer of vinylidene fluoride and hexafluoropropylene.

9. The blend of claim 1 additionally containing one or more metal cation sources selected from the group consisting of zinc oxide and magnesium oxide.

10. The blend of claim 1 additionally containing calcium hydroxide.

11. The blend of claim 1 additionally containing titanium oxide pigment.

12. The blend of claim 1 in which the crystalline thermoplastic fluorocarbon resin is tetrafluoroethylene/ethylene/perfluorobutyl ethylene copolymer.

13. The blend of claim 1 additionally containing filler.

14. A process for the preparation of the blend of claim 1 comprising:
   (a) melt blending a melt-processible crystalline thermoplastic fluorocarbon resin containing a minimum of 38 percent by weight fluorine, an amorphous uncured fluoroelastomer containing a minimum of 50 percent by weight fluorine, and a dispersion-process-produced, non-fibrillating, non-melt-processible tetrafluoroethylene copolymer comprising recurring units of tetrafluoroethylene and a comonomer selected from the class consisting of hexafluoropropylene, perfluoro(alkyl vinyl ether) where the alkyl group has 1-4 carbon atoms, and a mixture of them, with enough comonomer present to cause the tetrafluoroethylene copolymer to compound uniformly with said fluorocarbon resin and fluoroelastomer without forming visible agglomerates; and
   (b) crosslinking the fluoroelastomer in the presence of one or more curing agents, metal oxides and hydroxides at a temperature that is above the melting point of the fluorocarbon resin.

15. The process of claim 14 in which one or more curing agents, metal oxides and hydroxides are added to the fluoroelastomer prior to introduction to the molten fluorocarbon resin.

16. The process of claim 14 wherein poly(phenylene sulfide) powder is added to the mixture together with the tetrafluoroethylene copolymer.

17. The process of claim 14 wherein an uncured fluoroelastomer of a copolymer of tetrafluoroethylene and perfluoro(methyl vinyl ether) is added to the mixture together with the tetrafluoroethylene copolymer.

* * * * *